O. J. BLISS.
PROTECTIVE RELAY SYSTEM.
APPLICATION FILED JULY 29, 1918.

1,310,821.

Patented July 22, 1919.

Inventor
Orville J. Bliss
By Brown Hanson & Berkeley
Attorneys

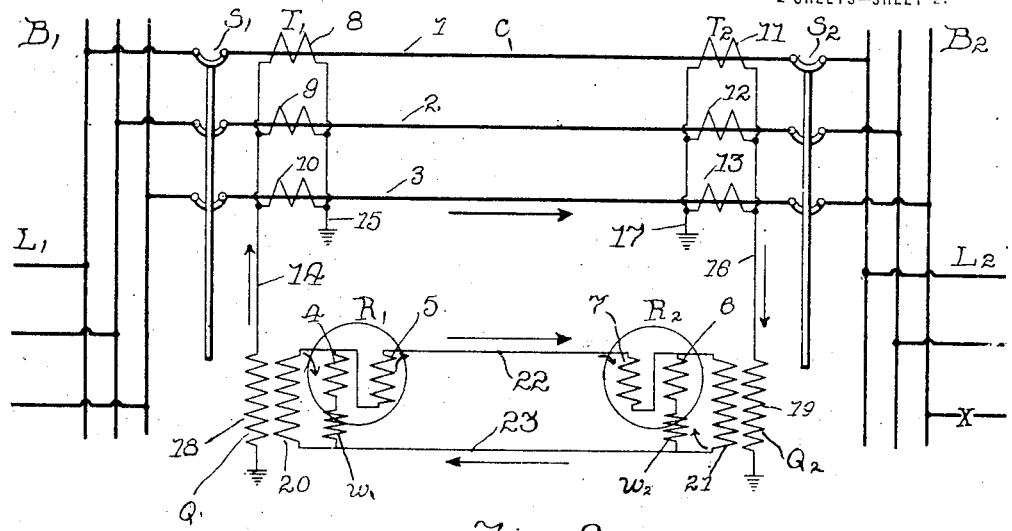

UNITED STATES PATENT OFFICE.

ORVILLE J. BLISS, OF CHICAGO, ILLINOIS.

PROTECTIVE RELAY SYSTEM.

1,310,821.  Specification of Letters Patent.  Patented July 22, 1919.

Application filed July 29, 1918. Serial No. 247,133.

*To all whom it may concern:*

Be it known that I, ORVILLE J. BLISS, a citizen of the United States, residing at Chicago, in the county of Cook and State of Illinois, have invented a certain new and useful Improvement in Protective Relay Systems, of which the following is a full, clear, concise, and exact description, reference being had to the accompanying drawings, forming a part of this specification.

My invention relates to protective devices for electrical apparatus and more particularly to a protective relay system for disconnecting under abnormal conditions the electrical apparatus to be controlled. In such systems it is customary to provide a switch at each end of the cable or feeder to be protected or at the terminals—that is, upon each side of the generator or other piece of apparatus to be protected and to control the operation of these disconnecting switches by relays related serially to the line or other piece of apparatus. It is customary to provide series transformers at each end of the feeder, cable or other piece of apparatus and to connect the relays in a closed circuit in series with the secondaries of the transformers by means of pilot wires.

Heretofore these transformers have been so connected that the potentials generated either during normal operation or upon the occurrence of a through fault, are opposed to each other so that no current shall flow at such times and consequently the relays are supposed to remain inactive, until a fault in the line results in unequal voltage or cumulative voltages.

In practice it has been found that such a relay system is subject to serious defects, which impair the effectiveness of the same. Particularly one fault of such opposed voltage systems which is very noticeable upon the occurrence of a through fault,—that is a fault occurring beyond the particular section or piece of apparatus under consideration—is the failure to maintain a balance of voltages. In such case a very heavy current flows through the feeder or other piece of apparatus under consideration, with the result that the voltage on the secondaries of the series transformers may rise to a dangerously high value. The opposition of these voltages to each other for all values of current which may flow through the feeder or other piece of apparatus, requires the characteristics of the transformers to be identical over a very wide range. If the characteristics are different at any point, current will flow in the closed relay circuits and the relays may be operated when the same is not desirable. Where a through fault occurs under the above conditions, the feeder or cable or other piece of apparatus will erroneously be cut out of the circuit when the same is not required and a considerable part of the system may be cut off when all that is necessary is that the defective line or piece of apparatus be disconnected.

Even if the characteristics of the transformers be near enough alike not to trip out the switches, the condition of balanced voltage permits the voltage at the terminals of the secondaries to rise to abnormally high values upon the occurrence of the through fault, as the condition of the series transformers is then substantially the same as upon open circuit.

The condition of opposed voltage tends to cause a distorted wave shape unless the two transformers are exactly alike in this characteristic.

In a balanced system of this type it has been found to be substantially impossible to obviate the current which will flow, due to the capacity of the pilot wires. This current may rise to high enough value to trip out the switches when the same is not desirable. This condition is aggravated by the occurrence of a through fault.

The difficulty of charging or capacity current has been found to be very serious and numerous expedients have been tried by the prior art to overcome the same.

A further defect of the balanced voltage system resides in the condition which would be caused by an open pilot wire. If one of the pilot wires were interrupted in a balanced voltage protective system the system would become inoperative and would not trip out the switches under any condition.

My invention aims to provide a system of relays balanced by current flow.

Instead of employing such a connection of current transformers as will result in opposed voltages for through fault conditions and additive voltage for internal fault condition, I reverse the relation and employ such a connection as will produce balanced voltage only upon the occurrence of internal fault conditions and additive voltages upon the occurrence of a through fault condition.

By this arrangement the disadvantages above pointed out are obviated or become of no importance.

I employ differential tripping relays, preferably of the plunger type, which have two windings through which the current flows upon the occurrence of a through fault in such direction as to neutralize the respective magnetic effects. The neutralization might, of course, be accomplished otherwise.

I employ for three-phase systems a current transformer in each phase. The secondaries are connected together and the terminals connected to ground by common leads. These secondaries which are connected together in parallel normally maintain a circulating current which has no effect upon the relay circuit. In one of the leads to ground I connect the primary of a current transformer, the secondary of which is connected to a differential relay and to the pilot circuit. A resistance equivalent to the resistance of one pilot wire is connected in series with one winding of each of the differential relays and these relay windings with resistances in series are connected each in a bridge across the terminals of the adjacent transformer secondaries. The arrangement of current transformers may be varied, as may other features of the system, as my invention is broadly new as to the employment of current flow for maintaining a condition of balance as distinguished from employing opposed voltages to maintain a condition of balance. It will be appreciated that the normal circulating current through the secondaries of the three current transformers holds the system in a balanced condition during the normal operation of the three-phase system. The same method of operation may be employed in a single-phase system; that is by employing a transformer in each lead a circulating current may be maintained in the secondaries of the transformers. Or if desired, the flow of current may normally occur through the pilot wires and relays. This latter is less desirable because of the resistance of the relays and the pilot circuit.

In order to teach those skilled in the art more particularly of the nature and scope of my invention and the preferred manner of embodying and practising the same, I shall now refer in detail to the following specification and claims, together with the accompanying drawings, in which—

Fig. 2 is a similar diagram showing the system in the condition of a through fault;

Fig. 3 is a diagram similar to Fig. 1, showing a fault occurring on one phase of the feeder to be protected;

Figure 1:
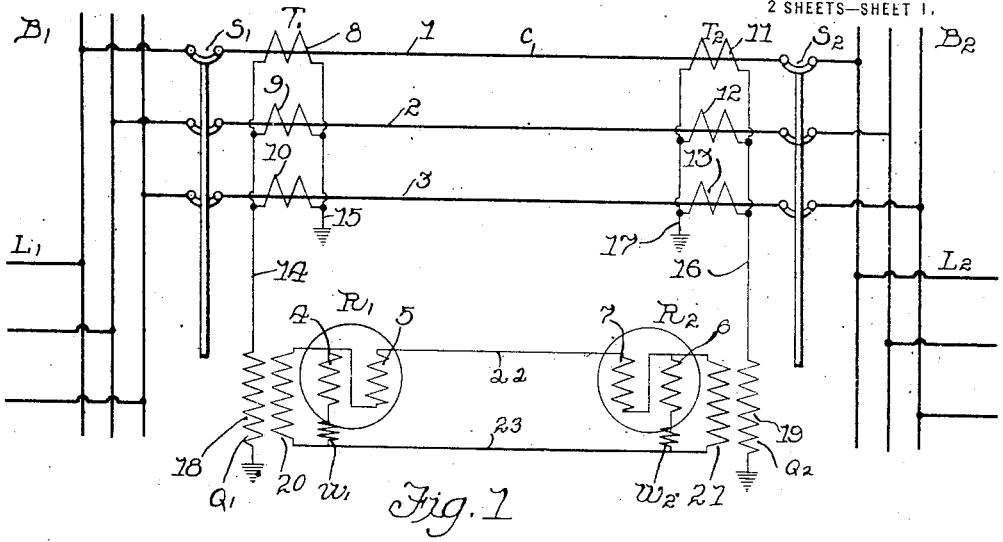
Figure 1 is a diagram of a system employing my invention with the parts in normal condition.

I have shown in Fig. 1 a diagram illustrates three leads, 1, 2 and 3, in a typical invention. In this case the cable C which has three leads, 1, 2 and 3, in a typical 3-phase installation, is the piece of apparatus or line to be controlled. This cable is a feeder between the power bus $B_1$ and the distributing bus $B_2$. The power bus $B_1$ is connected by means of the line $L_1$ to a suitable source of power. The bus $B_2$ is connected to various distributing lines, of which the line $L_2$ is typical. The cable C thus forms a feeder between the power bus $B_1$ and the distributing bus $B_2$. Automatic disconnecting switches $S_1$ and $S_2$ control a connection of the feeder C with the buses $B_1$ and $B_2$. These switches are of the automatic tripping type and the tripping of the same is controlled by the relays $R_1$ and $R_2$ respectively. The relays are of the plunger type, having the two windings 4, 5 and 6, 7 respectively.

At each end of the cable C I provide the group or bank of series transformers $T_1$ and $T_2$ of which the secondaries 8, 9, 10 and 11, 12, 13 are connected together respectively and the common connections are grounded by means of the wires 14, 15 and 16, 17 respectively. In the ground connections 14 and 16 I provide the series transformers $Q_1$ and $Q_2$ respectively. The primary windings of these transformers are connected in series with the ground connections 14 and 16. The secondaries of these transformers are connected together in a closed circuit by means of the pilot wires 22, 23. The windings 5 and 7 of the relays $R_1$ and $R_2$ are also connected in series in this closed circuit. The differential coils 4 and 6 are bridged across the terminals of the transformer secondaries 20 and 21 respectively. In series with the coils 4 and 6 there are connected the resistances $W_1$ and $W_2$ respectively, these resistances being of substantially the same value as the resistance of one of the pilot wires 22 and 23.

Normally no current flows in the ground connections 14 and 16, respectively, as there is only a circulating current through the secondaries of the series transformers $T_1$ and $T_2$, the external result of which is substantially zero. Any small unbalance which may cause a current flow through these leads will be insufficient to cause operation of the differential relays $R_1$ and $R_2$. For all conditions of balance or unbalance in the load of the three phases the flow of current in the secondaries of the transformers $T_1$ and $T_2$ is neutralized and no current flows in the ground connections 14 and 16.

In the event of a through fault, as indicated at X in Fig. 2, the relays will not be tripped out as this fault should be handled by itself by protective apparatus on the line $L_2$ so as to prevent interruption of the service supplied from the bus $B_2$. I have indicated in Fig. 2, by means of the arrows, the direction which the current may be assumed to take, both in the phase 3 and the affected parts. The representation of direction of current flow in the secondary of each transformer is merely diagrammatic and is consistently shown as in the same direction as current in the primary. As a fault between phases will eventually be developed into a fault to ground, the system will operate properly in either case.

Assuming that current is flowing in the direction indicated by the arrow adjacent the wire 3, we may assume that current will be caused to flow similarly in the grounded leads 14 and 16, as indicated by the arrows adjacent thereto. These currents flowing through the primaries 18 and 19 of the transformers $Q_1$ and $Q_2$ will impress voltages upon the secondaries of the transformers so that current will tend to flow upward in the winding 20 and downward in the winding 21 with the result that there is a current flow as indicated by the arrows adjacent the pilot wires 22 and 23 which circulates through the secondaries of the transformers and through the windings 5 and 7 of the relays $R_1$ and $R_2$. At the same time a current will flow downward in the winding 4 and resistance $W_1$ and upward in the relay winding 6 and resistance $W_2$ due to these respective parts being bridged across the respective secondaries of the transformers. The current which flows through the bridged relay coils 4 and 6 is substantially equal to the current which flows in series through the relay coils 5 and 7. This is for the reason that the potentials of the windings 20 and 21 are substantially equal and because the resistances $W_1$ and $W_2$ are made each substantially equal to the resistance of a pilot wire. As equal currents flow in the windings 4 and 5 and in opposite directions, the relay $R_1$ will not be operated. The same is true as to the relay $R_2$.

It will be appreciated at once that exact similarity of characteristics of the transformer windings 20 and 21 is not essential. This is readily appreciated when it is considered that the magnetic effects of the current normally flowing in the pilot wires 22 and 23 is in opposition to the magnetic effects of the local currents flowing through the relay windings 4 and 6 and any slight unbalance will be insufficient to operate the relays. As the E. M. F.s of the transformer windings 20 and 21 have the same phase relation and are connected together by a closed circuit of relatively low resistance, through which current flows, unduly high potentials are not developed.

Upon the occurrence of a fault within the cable C, as indicated in Fig. 3 at the point $X'$, the relays $R_1$ and $R_2$ will operate to trip the switches $S_1$ and $S_2$ cutting out the cable. I have added the appropriate arrows indicating the directions of the current flow. Current will flow from each side of the fault $X'$ to ground, as indicated by the arrows adjacent the wire 3. This causes current to flow in the grounded leads 14 and 16 and through the primaries of the transformers $Q_1$ and $Q_2$, as indicated by the arrows adjacent said wires. Due to the current flowing through the primary windings, potentials will be created at the secondary windings 20 and 21, but these potentials will be in opposition to each other, as indicated by the arrows which I have placed near the pilot wire 22. As a consequence, the current flowing through the windings 4 and 6 is effective to trip the relays $R_1$ and $R_2$, thereby causing the switches $S_1$ and $S_2$ to disconnect the cable.

It is not essential that current should flow into the fault $X'$ from each end, as it may be assumed that current will flow only from the left of the fault $X'$ into said fault, so that the transformer $Q_1$ will be energized. In such event, current will flow from the upper terminal of the transformer winding 20 in the proportion of 3 parts through the winding 4 and the resistance $W_1$ and one part through the relay winding 5, pilot wire 22, relay winding 7 of relay $R_2$, thence through relay winding 6, resistance $W_2$ and through the pilot wire 23. However, the current flowing through the windings 6 and 7 of the relay $R_2$ flows through these windings in series and is therefore additive. The result is equivalent to the result which is produced at the relay $R_1$, namely, the magnetic effect of half the total current flowing through a single relay winding. As a result, both relays R₁ and R₂ are operated to trip out the switches S₁ and S₂.

The above explanation will also make clear that the system will operate to disconnect a cable which has a fault and which is connected at either end to a source of current.

It will also be apparent from the above statement of operation that each relay would be operative to disconnect its switch upon the occurrence of a fault if one or both of the pilot wires should become broken.

Under no condition is the opposition of the relay transformers equivalent to open circuit as with the balanced voltage system. Even with exact opposition on the pilot circuit, there is still a comparatively low impedance circuit for each transformer through the bridged relay coils 4 and 6 with their series resistance. Therefore, wave shape distortions, capacity effects and high potentials occur in a relatively small degree and then only under conditions when this is of no importance.

The relay which I have shown being of the plunger type will reset itself and thus will always be in condition to operate whenever the switch is closed. The relay may or may not be of the self-resetting type as desired. The operation of the relay and the tripping of the switch at one end of a line before the relay at the other end of the line has acted will not prevent the relay at the other end from tripping its switch.

In tests which I have conducted, I have employed for the transformers T₁ and T₂ current transformers of the ratio of 5 to 1, and have employed for the transformers Q₁ and Q₂ current transformers of a ratio of 2 to 1. The relays which I employed are of the instantaneous plunger type relays wound with 2½ amperes differential coils. The pilot circuit was operated over conductors which are the equivalent to 5 miles of No. 12 duplex copper conductors.

Figure 4:
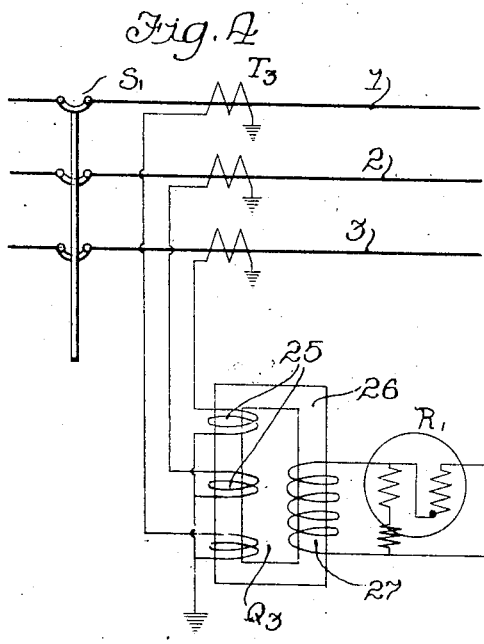
Fig. 4 is a diagram of a modification of the manner of connecting the series transformers with the pilot wires.

It will be apparent to those skilled in the art that the manner of connecting the closed relay circuit in series relation with the line or other piece of apparatus to be controlled, may be varied. I have shown modifications in Figs. 4, 5 and 6. In the modification shown in Fig. 4 the transformers T₃ are connected at one terminal of each individually to ground, and the other terminal is connected through a coil 25 and to ground. The coils 25 are wound upon a common magnetic core 26 which in turn is interlinked with the transformer winding 27, which corresponds with the winding 20 shown in Figs. 1, 2 and 3.

The operation of this modification will be apparent from the previous description.

Figure 5:
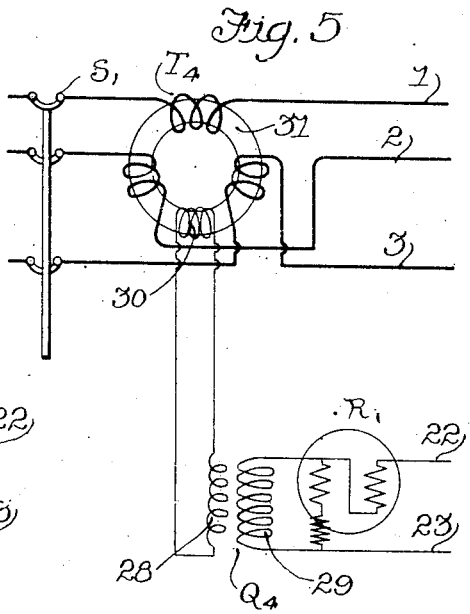
Fig. 5 is a similar fragmentary diagram of a modification of the arrangement for connecting the current transformer with the closed pilot system.

In Fig. 5 I have shown the magnetic core 31 as common to the conductors 1, 2 and 3 of the cable or line to be controlled. The winding 30 is connected to the primary 28 of the current transformer Q₄ which links the lines 1, 2 and 3 with the closed pilot circuit.

Figure 6:
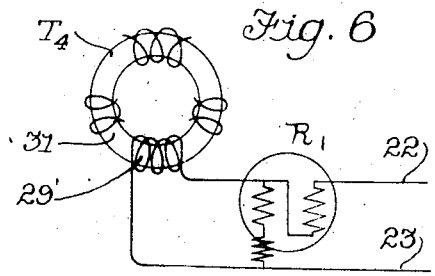
Fig. 6 is a further modification in which the secondary winding of the series transformer of the closed pilot system is directly mounted upon a core of the common current transformer.

The transformer windings 30 and 28 may be dispensed with and the winding 29 may be placed directly upon the magnetic core 31, if desired, as shown in Fig. 6.

In Figs. 5 and 6 there is no circulating current between the power circuit and the pilot circuit but this is replaced by a circulating magnetic flux in the core 31.

I do not intend to be limited to the precise details of construction shown and described.

I claim:

1. In combination, a pair of relays, a pair of pilot wires connecting said relays and transformer windings connected to said relays and pilot wires, the electro-motive forces of said transformer windings being normally additive to cause current to flow through the pilot wires and relays.

2. In combination, a conductor, a pair of relays, a pair of pilot wires connecting said relays and transformer windings connected to said relays and to said pilot wires, said relays having means subjected to current flow by said transformer windings to maintain the relays inoperative on through fault conditions, said relays being subjected to additive voltages of the transformer windings upon normal current flow in the conductor or upon through fault conditions, and being subject to opposed voltages upon internal fault conditions.

3. In combination, a three-phase line, a series transformer at each end of the line in each phase, said windings at each end of the line being connected in parallel, a transformer connected in series with said parallel connection at each end of the line, each of said latter transformers having a secondary, pilot wires connecting said secondaries together in a closed circuit with electro-motive forces additive and relays connected to said secondaries and to said pilot wires, said relays having differential windings balanced by current flow for through fault conditions.

4. In combination, a line, a pair of relays, each relay comprising a pair of differential windings of substantially equal resistance, a pair of pilot wires, one of said wires being connected to one terminal of one winding of each relay, the other terminal of said one winding of each relay being connected to one terminal of the second winding of each relay, said windings having opposed magnetic effects, a resistance for each relay, each said resistance being connected to the other terminal of said second winding of each relay, a transformer winding for each relay, each transformer winding being serially related to the line, one terminal of each transformer winding being connected to the connection between the relay windings and the other terminal of each transformer winding being connected to the resistance of each relay, the second pilot wire being joined to the connection between each transformer winding and its adjacent resistance.

5. In combination, a line, a pair of relays, each relay comprising a pair of differential windings of substantially equal resistance, a pair of pilot wires, one of said wires being connected to one terminal of one winding of each relay, the other terminal of said one winding of each relay being connected to one terminal of the second winding of each relay, said windings having opposed magnetic effects, a resistance for each relay, each said resistance being connected to the other terminal of said second winding of each relay, a transformer winding for each relay, each transformer winding being serially related to the line, one terminal of each transformer winding being connected to the connection between the relay windings and the other terminal of each transformer winding being connected to the resistance of each relay, the second pilot wire being joined to the connection between each transformer winding and its adjacent resistance, said pilot wires being of substantially equal resistance, each said resistance being substantially equal to the resistance of one of said pilot wires.

6. In combination, an electrical device to be controlled, said device having terminals at each side thereof, a transformer winding serially related to said device adjacent each terminal of the device, switching means for disconnecting said terminals, a relay for each transformer winding, said relays having differential windings, pilot wires connecting the transformer windings together with their electro-motive forces additive to maintain a normal flow of current due to said additive electro-motive forces, said relays having each one winding connected in series with the pilot wires and one winding in bridge of said pilot wires, the magnetic effect of said windings of each relay being normally opposed to prevent operation of the relay.

7. In combination, a conductor having a switch at each end thereof, a pair of relays each controlling one of said switches, a transformer winding for each relay serially related to said conductor, a pair of pilot wires connecting said transformer windings in series with their electro-motive forces additive to maintain a circulation of current on through fault conditions, said relays having differential operating coils of substantially equal effect, one winding of each relay being connected in series with the pilot wires and the other winding being connected in bridge of said pilot wires.

8. In combination, a conductor having a switch at each end thereof, a pair of relays each controlling one of said switches, a transformer winding for each relay serially related to said conductor, a pair of pilot wires connecting said transformer windings in series with their electro-motive forces additive to maintain a circulation of current on the occurrence of through fault conditions, said relays having differential operating coils of substantially equal effect, one winding of each relay being connected in series with the pilot wires and the other winding being connected in bridge of said pilot wires, and a resistance connected in the bridge with said relay winding for balancing the current flow in the windings of each relay.

9. In combination, a conductor having terminals, a transformer winding adjacent each terminal of said conductor, said windings being serially related to said conductor, a relay for each transformer winding, said relay having differential windings of substantially equal electrical dimensions, a pair of pilot wires connecting said transformer windings with the electro-motive forces additive to maintain a normal circulation of current, one winding of each relay being connected in series with the pilot wires and the other windings of each relay being connected in bridge of said pilot wires and a resistance substantially equal to the resistance of one pilot wire connected in each bridge only.

10. In combination, an electrical device to be controlled, transformer windings serially related to said device and located adjacent the terminals of the device, switching means for said terminals, a pair of relays having differential windings, said relays controlling said switching means, pilot wires connecting said relays in a closed series circuit, the connections of said relays said transformer windings and said pilot wires being such as to maintain a flow of current through said relays and pilot wires during normal current flow in said device.

11. In combination, a feeder, a switch at each end of the feeder, a relay for controlling each switch, pilot wires connecting said relays in a closed circuit, transformer windings included serially in said closed circuit at each end of the feeder, said transformer windings being serially related to said feeder, the electromotive force of said transformer windings being additive to cause current to flow normally in the closed circuit.

12. In combination, a feeder, a switch at each end of said feeder, relays controlling each switch, and a series transformer for each relay, the secondaries of the transformers being connected for normal conditions in a closed circuit with the relays with their electromotive forces additive, said relays having means for preventing a flow of current in the feeder due to a through fault from operating said relays.

13. In combination, a feeder, a switch at each end of the feeder, a relay controlling each switch, a series transformer winding for each relay, said windings being serially related to the feeder, and being connected in a closed circuit with the relays with their electromotive forces additive for a through fault condition, said relays comprising each a differential winding.

14. In combination, a line, a switch at each end of the line, a relay for each switch, said relays each having differential windings, a series transformer winding for each relay, said transformer winding being serially related to the line with electro-motive forces additive, pilot wires connecting one winding of each relay in series with both transformer windings and means connecting the other winding of each relay in parallel across a portion of said closed circuit.

15. In combination, a line, a switch at each end of the line, a relay controlling each switch, a series transformer winding for each relay, said relays each having a pair of windings, means connecting the transformer windings and one of the relay windings of each relay in a closed series circuit with the electro-motive forces of the transformer windings additive, and means connecting the other windings of said relays in bridge across the terminals of said transformer windings respectively.

16. In combination, a line, a switch at each end of the line, a relay controlling each switch, a series transformer winding for each relay, said relays each having a pair of windings, means connecting the transformer windings and one of the relay windings of each relay in a closed series circuit and means connecting the other windings of said relays in bridge across the terminals of said transformer windings respectively, and a resistance in series with each of the bridged relay windings only.

17. In combination, a line, a switch at each end of the line, a relay controlling each switch, a series transformer serially related to the line adjacent each switch, said transformer having secondary windings, said relays each having a pair of differential windings, pilot wires connecting the secondaries of the transformers in a closed circuit with one winding of each relay, the other winding of each relay being bridged across the terminals of the secondary of each transformer, respectively, and resistances in series with the latter windings only, said resistances being each equivalent to the resistance of one pilot wire.

18. In a three-phase system, a three-phase line, a switch at each end of the line, a relay controlling each switch, a series transformer in each phase of the line adjacent each end, the secondaries of said series transformers at each end of the line being connected together and to a common return, a pair of series transformers common to the transformers of each phase, said common transformers being connected in series with the common return, a pair of pilot wires connecting the secondaries of the common transformers in a closed series circuit with electro-motive forces additive, said relays having each a winding connected in series in said closed circuit.

19. In a three-phase system, a three-phase line, a switch at each end of the line, series transformers serially related at each phase, one adjacent each end of the line, a pair of pilot wires connecting the secondaries of the transformers in a closed series circuit with their electro-motive forces additive upon the occurrence of a through fault, and relays connected in series in said closed circuit, said relays controlling said switch, said relays having each a pair of differential windings.

20. In combination, a line to be controlled, switches for the ends of the line, differential relays controlling the switches, pilot wires connecting windings of the relays in a closed circuit, and transformer windings serially related to the line with electro-motive forces additive and governing the operation of said relays, said transformer windings being normally traversed by a flow of current.

21. In a relay system for a conductor having a pair of transformer windings serially related to the conductor, pilot wires for connecting the transformer windings and relays with differential windings connected to said pilot wires, the improvement which consists in causing a flow of current through the relay windings and pilot wires and transformer windings by putting the electro-motive forces of the transformer windings in additive relation for through fault conditions.

In witness whereof I hereunto subscribe my name this 26th day of July, A. D. 1918.

ORVILLE J. BLISS.